(12) United States Patent
Kreischer

(10) Patent No.: US 12,521,862 B2
(45) Date of Patent: *Jan. 13, 2026

(54) HAND-HELD PULLING AND COMPRESSION DEVICE

(71) Applicant: TKR Spezialwerkzeuge GmbH, Gevelsberg (DE)

(72) Inventor: Torsten Kreischer, Wetter (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,452

(22) Filed: Jun. 24, 2024

(65) Prior Publication Data
US 2024/0424653 A1   Dec. 26, 2024

(51) Int. Cl.
*B25F 3/00*   (2006.01)
*B21J 15/10*   (2006.01)
*B21J 15/26*   (2006.01)

(52) U.S. Cl.
CPC ............... *B25F 3/00* (2013.01); *B21J 15/105* (2013.01); *B21J 15/26* (2013.01)

(58) Field of Classification Search
CPC .. B25F 3/00; B21J 15/105; B21J 15/26; B21J 15/28; B25B 27/10; B25B 27/0014; B25B 21/00; F16H 2025/2075; F16H 25/20
USPC ............... 173/1–2, 29, 46, 50, 90, 171, 213
See application file for complete search history.

(56) References Cited

U.S. PATENT DOCUMENTS

| | | | | | |
|---|---|---|---|---|---|
| 1,396,259 | A | * | 11/1921 | Coryell | B66F 3/10 |
| | | | | | 254/102 |
| 2,703,557 | A | * | 3/1955 | Polki | B25D 9/08 |
| | | | | | 30/388 |
| 2,768,539 | A | * | 10/1956 | Wollenhaupt | B23Q 15/00 |
| | | | | | 173/19 |
| 2,835,472 | A | * | 5/1958 | Osborn | E21B 7/046 |
| | | | | | 175/218 |
| 3,173,315 | A | * | 3/1965 | Fuldner | G05B 19/373 |
| | | | | | 91/170 R |

(Continued)

FOREIGN PATENT DOCUMENTS

| | | |
|---|---|---|
| DE | 7117376 | 1/1972 |
| DE | 102012007958 | 10/2013 |

(Continued)

*Primary Examiner* — Robert F Long
(74) *Attorney, Agent, or Firm* — ICE MILLER LLP; Justin D. Swindells

(57) ABSTRACT

The invention relates to a hand-held pulling and compression device for driving interchangeable tools, with
a drive unit with a battery-operated electric motor,
a screw drive with a threaded spindle mounted rotatably on a housing body and a threaded nut mounted rotatably on the threaded spindle and non-rotatably on the housing body via a bearing unit, and
a coupling unit connected to a tool holder for transmitting tensile and compressive forces resulting from the direction of rotation of the threaded spindle from the threaded nut to the tool holder.

Figure 1:
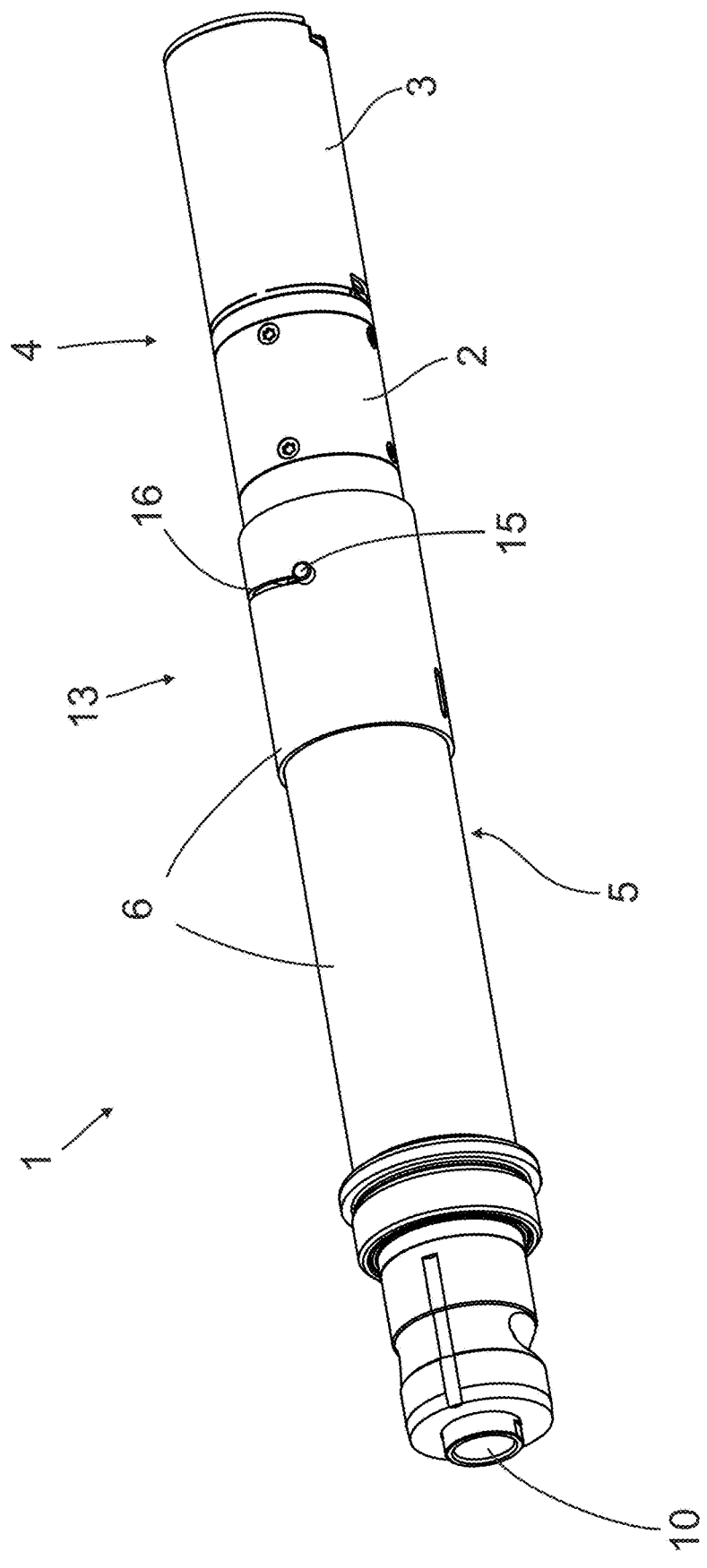

In order to provide a hand-held pulling and compression device that can be used easily and flexibly for different work operations, it is provided that the hand-held pulling and compression device has a switching unit for coupling and decoupling the screw drive from the drive unit.

9 Claims, 4 Drawing Sheets

(56) References Cited

U.S. PATENT DOCUMENTS

| | | | | |
|---|---|---|---|---|
| 3,464,655 A * | 9/1969 | Schuman | B28D 1/041 | |
| | | | 74/89.17 | |
| 3,825,075 A * | 7/1974 | Mee | B25H 1/0035 | |
| | | | 173/160 | |
| 4,073,197 A * | 2/1978 | Arnold | F16H 21/44 | |
| | | | 74/110 | |
| 4,192,393 A * | 3/1980 | Womack | E21B 7/028 | |
| | | | 173/160 | |
| 4,193,720 A * | 3/1980 | Machida | F16D 7/04 | |
| | | | 408/140 | |
| 4,223,744 A * | 9/1980 | Lovingood | B25D 16/00 | |
| | | | 318/245 | |
| 4,234,155 A * | 11/1980 | Destree | F16M 11/24 | |
| | | | 173/190 | |
| 5,347,765 A * | 9/1994 | Mixon, Jr. | B23Q 3/12 | |
| | | | 451/442 | |
| 5,518,163 A * | 5/1996 | Hooven | A61B 17/1285 | |
| | | | 227/19 | |
| 5,722,304 A * | 3/1998 | Allen | F16H 25/20 | |
| | | | 254/102 | |
| 5,954,259 A * | 9/1999 | Viola | A61B 17/07207 | |
| | | | 227/176.1 | |
| 6,651,301 B1 * | 11/2003 | Liu | B21J 15/043 | |
| | | | 81/341 | |
| 7,322,087 B1 * | 1/2008 | Hu | B25B 27/023 | |
| | | | 29/261 | |
| 7,562,594 B2 * | 7/2009 | Nagai | F16H 25/2015 | |
| | | | 188/134 | |
| 7,743,683 B2 * | 6/2010 | Dayton | B25F 3/00 | |
| | | | 173/217 | |
| 8,061,227 B2 * | 11/2011 | Sakai | F16C 29/02 | |
| | | | 74/89.32 | |
| 8,230,749 B2 * | 7/2012 | Shige | F16H 25/2015 | |
| | | | 74/89.34 | |
| 8,784,015 B2 * | 7/2014 | Elsmark | B23Q 5/402 | |
| | | | 173/147 | |
| 10,180,136 B2 * | 1/2019 | Sprocq | F16H 25/2056 | |
| 10,704,653 B2 * | 7/2020 | Almqvist | F16H 3/089 | |
| 11,441,648 B2 * | 9/2022 | Feitl | H01F 27/402 | |
| 11,504,830 B2 * | 11/2022 | Gordon | B25B 23/0028 | |
| 12,410,848 B1 * | 9/2025 | Zhao | F16H 1/46 | |
| 2003/0000322 A1 * | 1/2003 | Nagai | F16H 25/2204 | |
| | | | 74/89.36 | |
| 2003/0029295 A1 * | 2/2003 | Yoshimizu | B23D 29/00 | |
| | | | 83/697 | |
| 2004/0231870 A1 * | 11/2004 | McCormick | B25B 5/122 | |
| | | | 173/217 | |
| 2005/0188742 A1 * | 9/2005 | Snowden | B21D 1/10 | |
| | | | 72/457 | |
| 2005/0279517 A1 * | 12/2005 | Hoffman | B25F 3/00 | |
| | | | 173/29 | |
| 2006/0037766 A1 * | 2/2006 | Gass | B23B 49/008 | |
| | | | 173/20 | |
| 2008/0271552 A1 * | 11/2008 | Arenz | E05F 15/622 | |
| | | | 74/89.23 | |
| 2009/0193916 A1 * | 8/2009 | Watanabe | F16H 25/2021 | |
| | | | 74/216.3 | |
| 2010/0320252 A1 * | 12/2010 | Viola | A61B 17/068 | |
| | | | 227/176.1 | |
| 2011/0022032 A1 * | 1/2011 | Zemlok | A61B 17/07207 | |
| | | | 606/1 | |
| 2011/0135412 A1 * | 6/2011 | Duncan | B28D 1/041 | |
| | | | 408/72 R | |
| 2012/0116388 A1 * | 5/2012 | Houser | A61B 17/00234 | |
| | | | 606/1 | |
| 2012/0223121 A1 * | 9/2012 | Viola | A61B 17/07207 | |
| | | | 227/175.1 | |
| 2013/0093184 A1 * | 4/2013 | Peirce | F16L 13/146 | |
| | | | 29/237 | |
| 2013/0104360 A1 * | 5/2013 | Liu | B21J 15/105 | |
| | | | 29/243.523 | |
| 2013/0134009 A1 * | 5/2013 | Mueller | F16H 57/029 | |
| | | | 192/112 | |
| 2013/0189043 A1 * | 7/2013 | Uchiuzo | B23Q 15/12 | |
| | | | 408/1 R | |
| 2013/0265847 A1 * | 10/2013 | Little | B01F 27/1143 | |
| | | | 366/285 | |
| 2013/0296886 A1 * | 11/2013 | Green | A61B 34/70 | |
| | | | 606/130 | |
| 2014/0157919 A1 * | 6/2014 | Kondo | F16H 25/20 | |
| | | | 74/89.23 | |
| 2014/0309666 A1 * | 10/2014 | Shelton, IV | A61B 17/072 | |
| | | | 606/139 | |
| 2017/0095897 A1 * | 4/2017 | Moraru | B23Q 5/10 | |
| 2019/0069896 A1 * | 3/2019 | Satti, III | A61B 17/00 | |
| 2019/0105051 A1 * | 4/2019 | Swayze | A61B 17/115 | |
| 2019/0291157 A1 * | 9/2019 | Fuentes | B21D 1/10 | |
| 2020/0085442 A1 * | 3/2020 | Bear | H02J 7/00 | |
| 2020/0139426 A1 * | 5/2020 | Liu | B21J 15/043 | |
| 2020/0230686 A1 * | 7/2020 | Schneider | F16L 13/141 | |
| 2020/0262034 A1 * | 8/2020 | Hoppe | B25B 17/02 | |
| 2020/0297343 A1 * | 9/2020 | Satti, III | A61B 17/1155 | |
| 2020/0305870 A1 * | 10/2020 | Shelton, IV | A61B 17/07207 | |
| 2022/0061836 A1 * | 3/2022 | Parihar | A61B 17/0686 | |
| 2023/0202017 A1 * | 6/2023 | Sabic | B25F 3/00 | |
| | | | 173/217 | |
| 2023/0302620 A1 * | 9/2023 | Dubnicka | B25F 5/001 | |
| 2023/0346376 A1 * | 11/2023 | Beckman | A61B 34/37 | |
| 2023/0387639 A1 * | 11/2023 | Korsmeier | H02G 1/005 | |
| 2024/0238960 A1 * | 7/2024 | Kreischer | B25B 27/023 | |
| 2024/0424647 A1 * | 12/2024 | Kreischer | B21J 15/26 | |
| 2025/0058372 A1 * | 2/2025 | Kreischer | B25B 27/0014 | |

FOREIGN PATENT DOCUMENTS

| | | | | |
|---|---|---|---|---|
| DE | 202013100891 | | 6/2014 | |
| DE | 102016104075 | | 9/2017 | |
| DE | 102016104075 A1 * | 9/2017 | | |
| DE | 102019111352 A1 * | 11/2020 | | B25F 3/00 |
| DE | 202021106226 | | 12/2021 | |
| DE | 102021131294 | | 6/2023 | |
| WO | WO-2020048529 A1 * | 3/2020 | | |

* cited by examiner

HAND-HELD PULLING AND COMPRESSION DEVICE

CROSS-REFERENCE TO RELATED APPLICATION

This application is a convention priority application, which claims priority to Germany patent application number 10 2023 116 738.3, entitled "Hand-held Pulling and Compression Device," filed Jun. 26, 2023, the disclosure of which is incorporated herein by reference in its entirety.

The invention relates to a hand-held pulling and compression device for driving interchangeable tools, with
 a drive unit with a battery-operated electric motor,
 a screw drive with a threaded spindle mounted rotatably on a housing body and a threaded nut mounted rotatably on the threaded spindle and non-rotatably on the housing body via a bearing unit, and
 a coupling unit connected to a tool holder for transmitting tensile and compressive forces resulting from the direction of rotation of the threaded spindle from the threaded nut to the tool holder.

Hand-held pulling and compression devices, i.e. devices that can be used by a person on a mobile basis, such as hand-held, electric riveting and pressing devices for setting blind rivet elements, such as blind rivets and blind rivet nuts, or for carrying out punching processes and for setting punch rivets, which have a drive unit with an electric motor-driven threaded spindle of a screw drive, are known from the prior art in a variety of embodiments. The screw drive converts a rotational movement of the electric motor into a linear movement of the pulling and pressing tool in a known manner. In the case of the setting operation of a blind rivet element, for example, a mandrel of the blind rivet element is moved axially.

The above-described hand-held pulling and compression devices are used, for example, in vehicle workshops when carrying out repair work on the bodywork of vehicles and for maintenance work on tube or cable connections. Depending on the work to be carried out, it is necessary to use the pulling and compression devices to drive a wide range of different interchangeable tools.

Known hand-held devices that enable the operation of both pulling and pressing tools have the disadvantage of limited application possibilities.

On this basis, the invention is based on the object of providing a hand-held pulling and compression device which can be used simply and flexibly for different work operations.

The invention solves the object by a hand-held pulling and compression device with the features of claim 1. Advantageous further embodiments of the invention are given in the dependent claims.

According to the invention, the hand-held pulling and compression device has a switching unit for coupling and decoupling the screw drive from the drive unit.

The hand-held pulling and compression device according to the invention is connected via a coupling unit to a tool holder, which is designed to interchangeably accommodate different pulling and pressing tools required for the respective application. For example, when used as a compression device, the tool holder can be designed to hold a riveter, which is used in conjunction with a rivet clamp arranged on the compression device for setting rivets. When used as a pulling device, the tool holder can, for example, be provided with suitable clamping devices for a shank of the blind rivet or have other means for transmitting tensile forces. Alternatively or additionally, the tool holder can also be designed to hold corresponding pulling tools, whereby the pulling tools have, for example, clamping means by means of which the tensile forces can then be transmitted.

The coupling unit is connected to the threaded nut in such a way that both tensile and compressive forces resulting from the direction of movement of the threaded spindle and the resulting linear adjustment of the threaded nut are reliably transmitted to the coupling unit.

The switching unit is understood to be a unit that is intended to connect the screw drive decoupled from the drive unit to the latter or to separate the screw drive connected to the drive unit from the latter. The switching unit is preferably designed in such a way that the screw drive can be decoupled from the drive unit manually or, particularly preferably, automatically.

The pulling and compression device according to the invention makes it possible, depending on the work to be carried out, for example as part of its use in a vehicle workshop when carrying out bodywork, to arrange a tool required for the respective work operation on the tool holder. For example, the hand-held pulling and compression device can be used for both pulling and pressing work, such as setting blind rivets or carrying out punching work. The linear adjustment of the selected tool required for the respective work operation is reliably transferred to the tool holder via the coupling unit, as the coupling unit transfers both tensile and compressive forces from the threaded nut to the respective tool via the tool holder. For the pulling or pressing work, the tool holder is preferably moved continuously in the direction of the longitudinal axis of the threaded spindle by means of the tensile and compressive forces, and particularly preferably without abrupt changes of direction.

Furthermore, the switching unit provided according to the invention enables the decoupling of the threaded drive from the drive unit, whereby the rotational movement of the electric motor is not transmitted to the threaded spindle and thus the linear adjustment of the threaded nut and/or the coupling unit and/or the tool holder is blocked. In the event of an overload of the screw drive or if there is an immediate risk of injury to the user, for example due to hands or fingers remaining in the area of the tool, the switching unit can be used to stop the adjustment of the tool in a simple and reliable manner. Furthermore, by decoupling the screw drive from the drive unit, the switching unit enables the torque of the electric motor to be tapped independently of the screw drive, for example by arranging a rotating shaft.

According to an advantageous further development of the invention, it is provided that the switching unit is adjustable between a coupling state connecting the threaded spindle to the drive unit and a decoupling state separating the threaded spindle from the drive unit. In the coupling state, the screw drive is preferably connected to the drive unit via the switching unit in such a way that rotational movements of the electric motor are transmitted to the threaded spindle. In the decoupling state, the screw drive is preferably separated from the drive unit by the switching unit in such a way that the rotational movement of the electric motor is not transmitted to the threaded spindle. The switching unit is adjusted between the states manually, for example by a user, or automatically, for example by a control unit. By adjusting the switching unit between the coupling state and the decoupling state, it is also possible to couple and decouple the screw drive from the drive unit in a simple manner.

Preferably, the screw drive is designed such that a rotating shaft for transmitting rotational movements of the electric motor to a tool can be arranged on the electric motor.

According to an advantageous embodiment of the invention, it is provided that the threaded spindle is designed as a hollow spindle for receiving a rotating shaft connected to the electric motor. A hollow spindle is understood to be a threaded spindle with a hollow space extending in the longitudinal axis direction of the threaded spindle. The rotating shaft is preferably connected to the electric motor in such a way that the rotating shaft can be rotated independently of the switching unit arranged in the coupling state or in the decoupling state. Preferably, the rotating shaft is arranged coaxially to the hollow spindle. It is particularly preferred that the rotating shaft is mounted in the hollow spindle so that it can rotate about the longitudinal axis of the hollow spindle. For example, at least one bearing element, e.g. a roller bearing, such as a needle roller and cage assembly or a ball bearing, is provided for bearing the rotating shaft. Particularly preferably, the tool holder is also hollow in order to enable a rotating tool to be connected to the rotating shaft without prior removal of the tool holder connected to the coupling unit.

The design of the threaded spindle as a hollow spindle makes it easy to arrange the rotating shaft on the electric motor so that the rotating shaft rotates independently of the position of the switching unit. This makes it easy to switch between the transmission of tensile and/or compressive forces via the tool holder and the transmission of rotational movements by the rotating shaft. Furthermore, there is no need for a further tool holder connected to the threaded spindle for replacement of the tool holder connected to the coupling unit. In addition, the rotational movement transmitted from the rotating shaft to a tool is not restricted by the stroke of the threaded nut and/or the tool holder, so that the hand-held pulling and compression device is particularly flexible in use.

According to an advantageous further development of the invention, it is provided that the switching unit has a coupling element connecting the threaded spindle to the drive unit in the coupling state. The coupling element is preferably designed in such a way that, in the coupling state of the switching unit, the threaded spindle is connected via the coupling element to a drive shaft of the drive unit, for example of the electric motor or of a gear connected to the electric motor. Further preferably, the coupling element is designed in such a way that the threaded spindle is separated from the drive shaft in the decoupling state. Preferably, the coupling element is cylindrical in shape and has a cross-section that extends in the direction of the longitudinal axis, which for example is circular. Particularly preferably, the coupling element has an interior space extending in the direction of the longitudinal axis of the threaded spindle for at least sectional arrangement of the drive shaft and/or the threaded spindle and/or the rotating shaft. Preferably, the coupling element has an inner wall surrounding the interior space. For example, the coupling element is designed as a sleeve. The coupling element for connecting the threaded spindle to the drive shaft of the electric motor in the coupling state enables a simple design of the switching unit.

According to an advantageous embodiment of the invention, it is provided that the switching unit is designed and/or arranged on the housing body in such a way that the adjustment between the coupling state and the decoupling state is effected by an adjustment of the drive unit and/or the coupling element relative to the screw drive. An adjustment relative to the screw drive is understood to mean, for example, a movement of the coupling element along a movement path arranged at an angle to the longitudinal axis of the threaded spindle, preferably a movement of the drive unit and/or the coupling element along the longitudinal axis of the threaded spindle. The switching unit is particularly preferably arranged in the longitudinal direction of the threaded spindle between the screw drive and the drive unit. This makes it possible to dispense with adjusting the drive unit to change between the coupling state and the decoupling state, thus enabling a cost-effective design for the switching unit. The advantageous embodiment of the invention also enables effective and reliable coupling and decoupling of the screw drive from the drive unit.

According to an advantageous embodiment of the invention, it is provided that the coupling element has at least one coupling section for positive connection with the threaded spindle in the coupling state. The threaded spindle preferably has at least one connecting section that can be brought into engagement with the coupling section of the coupling element. The coupling section and/or the connecting section are preferably designed in such a way that, in the coupling state, a positive fit is created between the threaded spindle and the coupling element in the circumferential direction of the longitudinal axis of the threaded spindle. Preferably, the coupling element is positively connected to the drive shaft of the drive unit, for example via a feather key or a connection similar to a feather key.

The connecting section is preferably arranged on an end portion of the threaded spindle. The end portion of the threaded spindle describes a section extending from an end surface of the threaded spindle in the direction of the longitudinal axis of the threaded spindle. Preferably, the connecting section is formed as a depression of the threaded spindle and the coupling section is formed as a projection projecting from the inner wall into the interior space. In order to enable a low-resistance change from the decoupling state to the coupling state, the connecting section particularly preferably has an insertion area that widens at an angle to the longitudinal axis of the threaded spindle for guiding the coupling section when adjusting the switching unit from the decoupling state to the coupling state. Preferably, the coupling element has at least two, preferably at least three, particularly preferably at least four coupling sections distributed in the circumferential direction of the coupling element. The threaded spindle preferably has a number of connecting sections corresponding to the number of coupling sections.

The coupling section advantageously provided on the coupling element and the connecting section preferably provided on the threaded spindle enable the coupling element to be fixed to the threaded spindle in a simple manner and, due to the positive fit in the circumferential direction of the threaded spindle, a particularly reliable transmission of the rotational movement of the electric motor to the screw drive.

According to an advantageous further development of the invention, it is provided that the switching unit has an adjustment element for adjusting the coupling element between a coupling position assigned to the coupling state and a decoupling position assigned to the decoupling state. The adjustment of the coupling element from the coupling position to the decoupling position causes the switching unit to be adjusted from the coupling state to the decoupling state. The adjustment element is connected to the coupling element, for example mechanically or electro-mechanically, in such a way that the adjustment of the coupling element is effected by actuation and/or movement of the adjustment element. Particularly preferably, the coupling element for adjusting the switching unit from the coupling state to the decoupling state can be adjusted mechanically or electro-mechanically between the coupling position and the decoupling position. For example, the adjustment element is designed as an electrical actuator or preferably as a mechanical switching element. The switching unit and/or the coupling element can be adjusted between the coupling state and the decoupling state or the coupling position and the decoupling position in a particularly simple manner by means of the adjustment element.

According to an advantageous further development of the invention, it is provided that the switching unit has a guide for the adjustment element, which is designed in such a way that the coupling element is moved in the longitudinal direction of the threaded spindle for adjustment between the coupling position and the decoupling position. The guide is preferably arranged on the housing body of the device. Particularly preferably, the guide is designed as a recess in the housing body, along which the adjustment element for adjusting the coupling element between the coupling position and the decoupling position can be adjusted. For example, the guide is designed as an elongated hole or preferably as a helical groove. Helical is preferably understood to mean that the groove on the housing body is arranged in the manner of a screw or a helix around the longitudinal axis of the threaded spindle. The adjustment element is preferably adapted to the type and shape of the guide, i.e. in the case of a guide designed as a helical groove, the adjustment element is designed as a switch ring, for example. Preferably, the adjustment element is arranged on the coupling element in such a way that the adjustment element is secured against transmission of the torque of the electric motor from the coupling element to the adjustment element. Preferably, the adjustment element is mounted on the coupling element in order to counteract undesired rotation about the longitudinal axis of the threaded spindle. The guide enables simple and reliable adjustment of the coupling element between the coupling position and the decoupling position, so that the switching unit can be adjusted particularly easily and quickly between the coupling state and the decoupling state.

The torque of the motor can be transmitted to the coupling element and/or the threaded spindle and/or the rotating shaft in any desired manner. It is preferable for the drive unit to have a gear connecting the electric motor and the coupling element and/or the rotating shaft. The use of a gear allows high torques to be transmitted in a small installation space and weight.

The gears used are, for example, two- to three-stage planetary gears, but also cycloidal and spur gears, which offer the desired transmissions. Preferably, the speed of the electric motor and/or the gear ratio and/or the pitch of the threaded spindle are adjusted in such a way that the first tool holder connected to the threaded nut via the coupling unit is adjusted during operation at a feed speed of 700-8000 mm/min, preferably 1300-5100 mm/min, particularly preferably 1900-3800 mm/min, most preferably 2750 mm/min. Preferably, the gear has a transmission of 1:70 to 1:30, preferably 1:60 to 1:40, particularly preferably 1:55 to 1:45, most preferably 1:50. The speed of the electric motor is preferably 25000-30000 rpm, preferably 26000-29000 rpm, particularly preferably 27000-28000 rpm, most preferably 27500 rpm. In combination with preferably provided brushless motors, which are battery-operated, an optimal coordination between gear, threaded spindle and the resulting force can be achieved. Furthermore, the drive unit, in particular the electric motor and/or the gear, are formed in such a way that a torque of 10-100 Nm, preferably 15-95 Nm, most preferably 15-25 Nm and/or 75-95 Nm acts on the threaded spindle and/or the rotating shaft.

In the simplest embodiment of the hand-held pulling and compression device according to the invention, the electric motor can be operated in such a way that only the direction of rotation of the threaded spindle and/or the rotating shaft can be selected. According to an advantageous embodiment of the invention, it is provided that the pulling and compression device has a control unit connected to at least one sensor unit for controlling and/or archiving the operating processes.

According to this design, the use of a control unit allows targeted control of the corresponding operating processes, for example pulling, pressing and/or turning operations. For example, the control unit can be used to set the intended tensile or compressive forces in a particularly simple manner so that the operating processes can be carried out particularly reliably. Preferably, the control unit can be used to automatically switch between the positions of the adjustment element and thus the positions of the switching unit in the event of electro-mechanical adjustment of the adjustment element. This makes it possible to program more complex operations in which different work operations, for example using tensile and compressive forces or torques, can be carried out one after the other or in any combination. For example, a blind rivet nut is first screwed into the thread provided for this purpose by the torque transmitted via the rotating shaft and then, after switching the switching unit from the decoupling state to the coupling state, is set by the tensile forces generated by the screw drive and transmitted to the tool holder via the coupling unit. The control unit can also be provided to archive the operating processes carried out so that the work carried out can be reliably logged.

The sensor unit can be designed to monitor the adjustment travel, the pulling and pressing forces, the torque or the like, which is required for carrying out the work operations and their successful completion. According to a particularly advantageous embodiment of the invention, the control unit is provided with a display, which makes it particularly easy for the operating personnel to operate the hand-held pulling and compression device. Furthermore, this can also be connected to a central database via suitable wireless transmission means.

Figure 2:
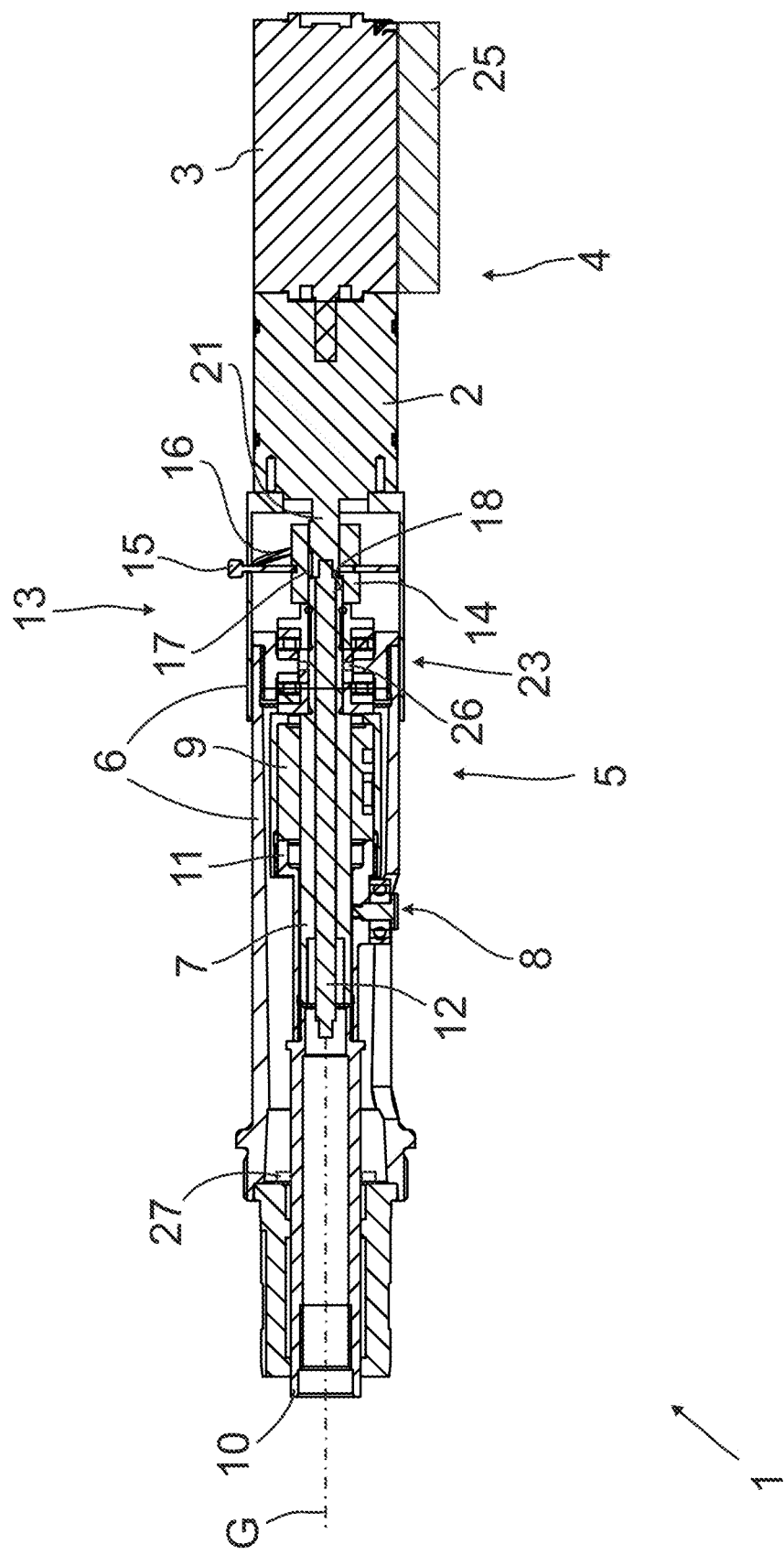
Figure 3:
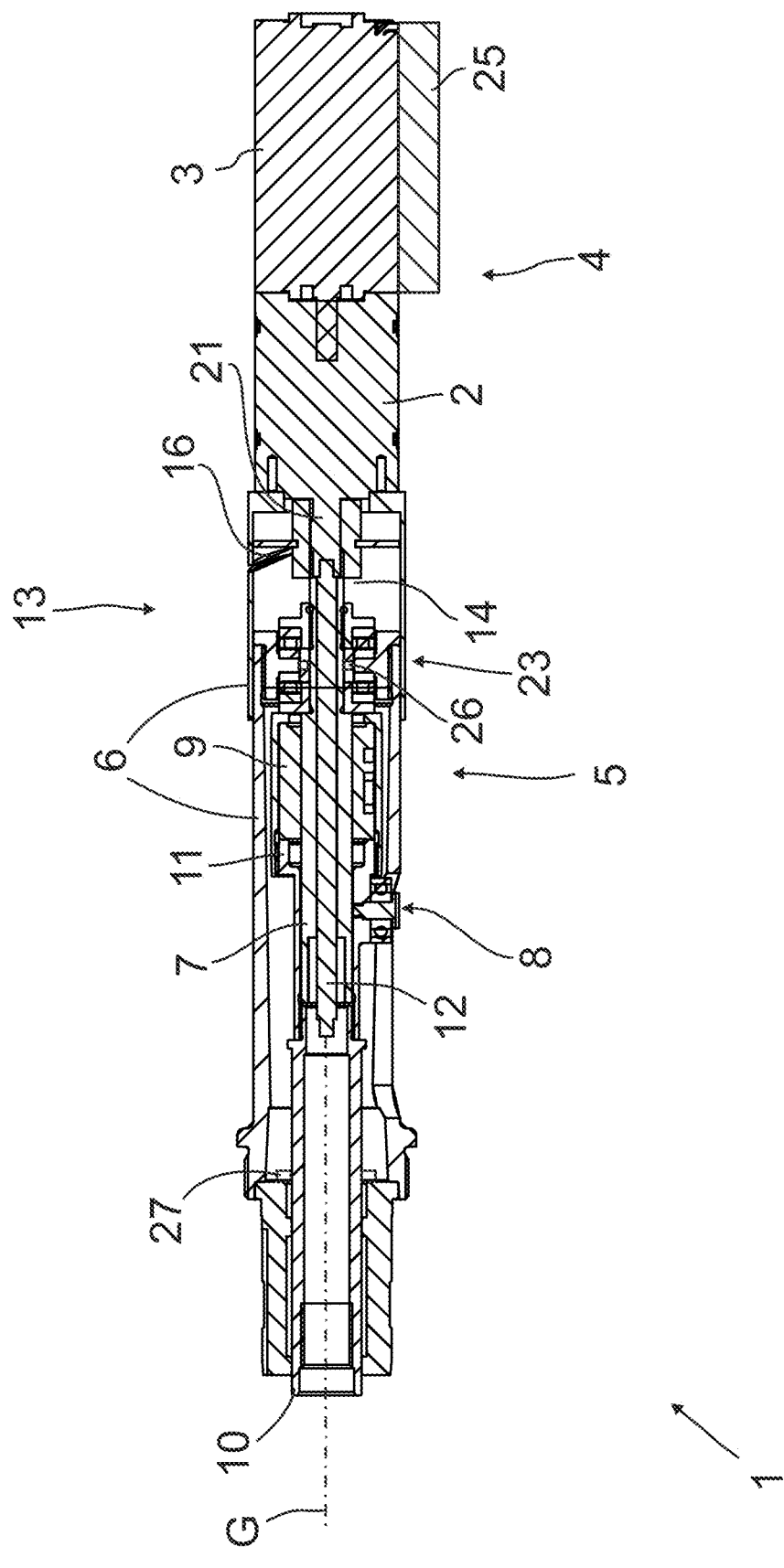
Figure 4:
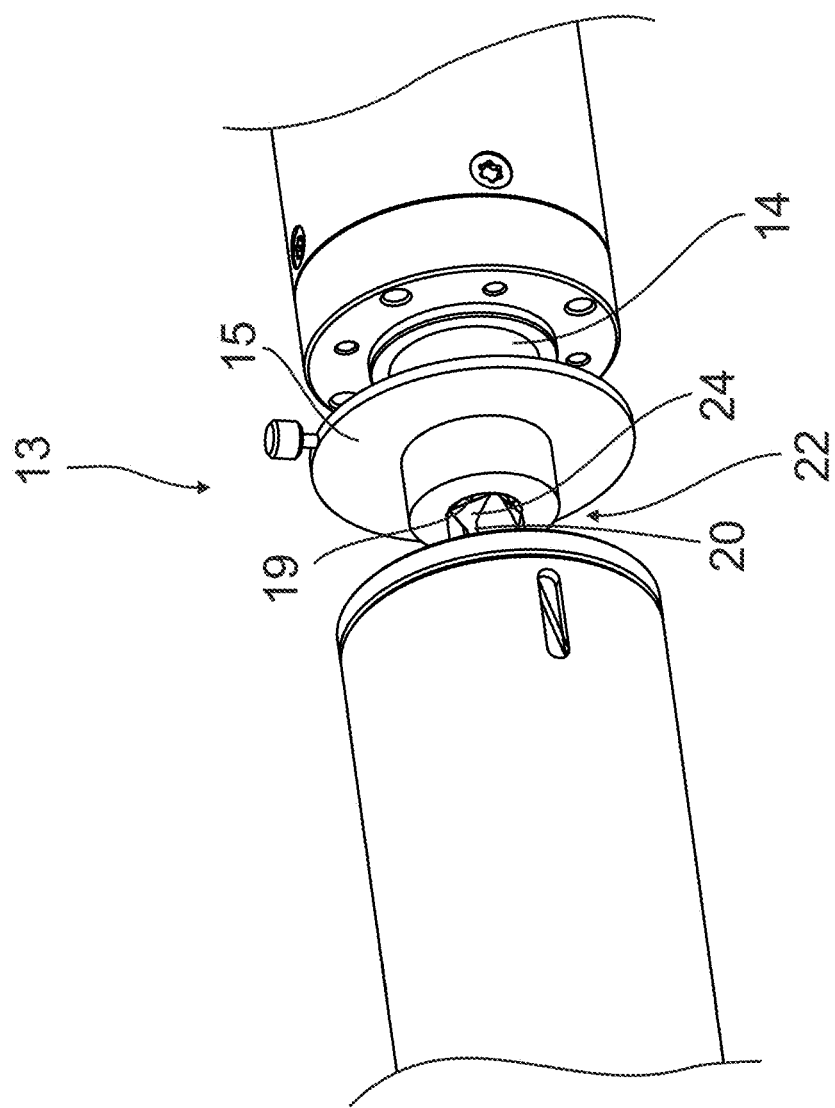

An embodiment of the invention is explained below with reference to the drawings. The drawings show in:

FIG. 1 a perspective view of a hand-held pulling and compression device with a switching unit;

FIG. 2 a longitudinal section of the pulling and compression device of FIG. 1 with the switching unit arranged in a coupling state;

FIG. 3 a longitudinal section of the pulling and compression device of FIGS. 1 and 2 with the switching unit arranged in a decoupling state, and FIG. 4 a detailed view of the switching unit of FIG. 4.

FIG. 1 shows a perspective view of a pulling and compression device 1 with a drive unit 4 comprising an electric motor 3 and a gear 2 connected to the electric motor 3. By means of the electric motor 3, a threaded spindle 7 of a screw drive 5, which can be connected to the gear 2, is driven via the gear 2, the threaded spindle 7 being rotatably mounted in a bearing seat 23 of a housing body 6 (see FIG. 2).

In addition to the threaded spindle 7, the screw drive 5 has a threaded nut 9 arranged on the threaded spindle 7, said threaded nut 9 is mounted non-rotatably on the housing body 6. The threaded nut 9 is used to drive a tool holder in the form of a piston rod 10, which is mounted so as to be adjustable in the longitudinal axis direction of the threaded spindle 7, i.e. in the direction of the threaded spindle axis G. The piston rod 10 is connected to the threaded nut 9 via a detachably connected coupling unit 11. A bearing unit 8, which is attached to the coupling unit 11, is used for non-rotatable mounting of the threaded nut 9 on the housing body 6.

The hand-held pulling and compression device has a switching unit 13 for coupling and decoupling the screw drive 5 from the drive unit 4. The switching unit 13 has a coupling element 14, an adjustment element 15 and a guide 16 for the adjustment element 15. The switching unit 13 can be adjusted between a coupling state, shown in FIG. 2, which connects the threaded spindle 7 to the drive unit 4, and a decoupling state, shown in FIG. 3, which separates the threaded spindle 7 from the drive unit 3.

The threaded spindle is designed as a hollow spindle 7 to accommodate a rotating shaft 12 connected to the electric motor 3. The rotating shaft 12 is connected to the electric motor 3 in such a way that the rotating shaft 12 can be rotated independently of the switching unit 13 arranged in the coupling state or in the decoupling state. Furthermore, the rotating shaft 12 is arranged coaxially to the hollow spindle 7.

The switching unit 13 is arranged in the longitudinal direction of the hollow spindle 7 between the screw drive 5 and the drive unit 4. The coupling element is designed as a sleeve 14 and has an interior space 17 extending in the direction of the threaded spindle axis G. A drive shaft 21 of the drive unit 4, the hollow spindle 7 and the rotating shaft 12 are arranged at least in sections in the interior space 17. Furthermore, the sleeve 14 has an inner wall 18 surrounding the interior space 17.

Furthermore, the sleeve 14 has four coupling sections 19 distributed in the circumferential direction of the hollow spindle 7 for positive connection with the hollow spindle 7 in the coupling state. The hollow spindle 7 has four connecting sections 20, each of which can be brought into engagement with one of the coupling sections 19 of the sleeve 14. The coupling sections 19 and the connecting sections 20 are designed such that, in the coupling state, a positive fit is created between the hollow spindle 7 and the sleeve 14 in the circumferential direction of the threaded spindle axis G. Furthermore, the sleeve 14 is positively connected to the drive shaft 21 via a connection similar to a feather key.

The connecting sections 20 are arranged on an end portion 22 of the hollow spindle 7. The connecting sections are formed as a depression 20 of the hollow spindle 7 and the coupling sections 19 are formed as a projection 23 projecting from the inner wall 18 into the interior space 17. In order to enable a low-resistance change from the decoupling state to the coupling state, the depressions 20 each have an insertion area 24 that widens at an angle to the threaded spindle axis G for guiding a coupling section 19 when adjusting the switching unit 13 from the decoupling state to the coupling state.

The guide 16 is arranged on the housing body 6 of the device 1 and is designed in such a way that the sleeve 14 is moved in the longitudinal direction of the hollow spindle 7 for adjustment between a coupling position assigned to the coupling state, shown in FIG. 2, and a decoupling position assigned to the decoupling state, shown in FIG. 3. The sleeve 14 can be mechanically adjusted between the coupling position and the decoupling position to move the switching unit 13 from the coupling state to the decoupling state.

Furthermore, the guide is designed as a helical groove 16 of the housing body 6, along which the adjustment element 15 can be adjusted to move the sleeve 14 between the coupling position and the decoupling position. The adjustment element is designed as a switch ring 15 and is mounted on the coupling element in such a way that the switch ring 15 is secured against transmission of the torque of the electric motor 3 from the sleeve 14 to the switch ring 15.

With the switching unit 13 arranged in the coupling state, the torque generated by the electric motor 3 is transmitted positively via the sleeve 14 to the hollow spindle 7 of the screw drive 5 and converted by the screw drive 5 into a translatory movement of the coupling unit 11 and the piston rod 10. To adjust the switching unit 13 from the coupling state to the decoupling state, the switch ring 15 is moved along the helical groove 16 and the sleeve 14 is adjusted relative to the screw drive 5 along the screw spindle axis G in the direction of the drive unit 3. As a result, the coupling sections 19 and the connecting sections 20 are disengaged and thus the positive fit of the sleeve 14 and hollow spindle 7 is released. In both positions, the torque of the electric motor 3 can be tapped via the rotating shaft 12 connected to the drive shaft 21 and transmitted to a rotating tool at the end of the rotating shaft 12.

Furthermore, a control unit 25, shown as an example in FIGS. 2 and 3, for controlling and/or archiving the operating processes is arranged on the hand-held pulling and compression device 1. The control unit 25 is connected to a rotation sensor 26 for detecting the torque of the electric motor 3 and a force sensor 27 for detecting the tensile and compressive forces of the piston rod 10.

The switching unit 13 allows the screw drive 5 to be decoupled from the drive unit 4, whereby the rotational movement of the electric motor 3 is not transmitted to the hollow spindle 7 and thus the linear adjustment of the threaded nut 9, the coupling unit 11 and the piston rod 10 is blocked. The design of the threaded spindle as a hollow spindle 7 and the rotating shaft 12 connected to the electric motor 3 via the drive shaft 21 and the gear 2 enable simple switching between the transmission of tensile and/or compressive forces via the piston rod 10 and the transmission of rotational movements via the rotating shaft 12.

All the features explained in connection with individual embodiments of the invention can be provided in different combinations for the hand-held pulling and compression device in order to realize their advantageous effects, even if they have been described for different embodiments. For example, the adjustment element 15 is alternatively designed as an electric actuator and enables automatic adjustment of the sleeve 14 by the control unit 25 connected to the switching unit 13. Alternatively or additionally, adjustment of the drive unit 4 and the sleeve 14 relative to the screw drive 5 is possible in order to couple the connection of the hollow spindle 7 to the sleeve 14 or to decouple it from the latter.

LIST OF REFERENCE SYMBOLS

1 Pull and compression device
2 Gear
3 Electric motor
4 Drive unit
5 Screw drive
6 Housing body
7 Threaded spindle (hollow spindle)
8 Bearing unit
9 Thread nut
10 Tool holder (piston rod)
11 Coupling unit 12 Rotating shaft
13 Switching unit
14 Coupling element (sleeve)
15 Adjustment element (switch ring)
16 Guide (helical groove)
17 Interior space
18 Inner wall
19 Coupling section (projection)
20 Connecting section (depression)
21 Drive shaft
22 End portion of the threaded spindle
23 Bearing seat
24 Insertion area
25 Control unit
26 Rotation sensor
27 Force sensor
G Threaded spindle axis

What is claimed is:

1. Hand-held pulling and compression device for driving interchangeable tools, with
    a drive unit comprising a battery-operated electric motor,
    a screw drive with a threaded spindle mounted rotatably on a housing body and a threaded nut mounted rotatably on the threaded spindle and non-rotatably on the housing body via a bearing unit, and
    a coupling unit connected to a tool holder for transmitting tensile and compressive forces resulting from the direction of rotation of the threaded spindle from the threaded nut to the tool holder,
    the device including a switching unit for coupling and decoupling the screw drive from the drive unit, wherein the threaded spindle is designed as a hollow spindle for receiving a rotating shaft connected to the electric motor.

2. Hand-held pulling and compression device according to claim 1, wherein the switching unit is adjustable between a coupling state connecting the threaded spindle to the drive unit and a decoupling state separating the threaded spindle from the drive unit.

3. Hand-held pulling and compression device according to claim 1, wherein the switching unit has a coupling element connecting the threaded spindle in the coupling state to the drive unit.

4. Hand-held pulling and compression device according to claim 3, wherein the switching unit is designed and/or adjusted on the housing body in such a way that the adjustment between the coupling state and the decoupling state is effected by adjusting the drive unit and/or the coupling element relative to the screw drive.

5. Hand-held pulling and compression device according to claim 3, wherein the coupling element has at least one coupling section for positive connection to the threaded spindle in the coupling state.

6. Hand-held pulling and compression device according to claim 3, wherein the switching unit has an adjustment element for adjusting the coupling element between a coupling position assigned to the coupling state and a decoupling position assigned to the decoupling state.

7. Hand-held pulling and compression device according to claim 6, wherein the adjustment element is designed such that the coupling element can be adjusted mechanically or electro-mechanically between the coupling position and the decoupling position in order to adjust the switching unit from the coupling state to the decoupling state.

8. Hand-held pulling and compression device according to claim 3, wherein the switching unit has a guide for the adjustment element, which is designed in such a way that the coupling element is moved in the longitudinal direction of the threaded spindle for adjustment between the coupling position and the decoupling position.

9. Hand-held pulling and compression device according to claim 1, wherein the switching unit is arranged in the longitudinal direction of the threaded spindle between the screw drive and the drive unit.

* * * * *